United States Patent [19]
Foo et al.

[11] Patent Number: 5,881,782
[45] Date of Patent: Mar. 16, 1999

[54] HOPPER WITH CARTRIDGE OPENER

[75] Inventors: Kean Fong Steven Foo, Lintang Delima Empat; Ka Tiek Lim, Taman Sungai Ara Bayan Lepas, both of Morocco

[73] Assignee: Motorola, Inc., Schaumburg, Ill.

[21] Appl. No.: 954,260

[22] Filed: Oct. 20, 1997

[51] Int. Cl.$^6$ ...................................................... B65B 1/04
[52] U.S. Cl. .......................................... 141/351; 141/364
[58] Field of Search .................................. 141/346–352, 141/364

[56] References Cited

U.S. PATENT DOCUMENTS

| | | | |
|---|---|---|---|
| 4,615,364 | 10/1986 | Kawata | 141/364 |
| 4,937,628 | 6/1990 | Cipolla et al. | 355/260 |
| 5,125,438 | 6/1992 | McCunn et al. | 141/364 |
| 5,313,993 | 5/1994 | Corby et al. | 141/364 |

*Primary Examiner*—Steven O. Douglas
*Attorney, Agent, or Firm*—Dale W. Dorinski

[57] ABSTRACT

A hopper (20) with a bias member (21) for coacting with a catch (12) for a sliding door (11) on a cartridge (10). Catch (12) has two abutments (13,14) for abutting with bias member (21). When cartridge (10) is inserted into hopper (20), bias member (21) abuts a bottom surface (15) of abutment (13) to force sliding door (11) to open and thereby create an outlet (18). Outlet (18) is on the bottom of cartridge (10) and allows transfer of components (23) into a receiving portion (22) of hopper (20). When cartridge (10) is removed from hopper (20), bias member (21) abuts a top surface (16) of abutment (13) to force sliding door (11) to close and thereby stop the transfer of components (23).

8 Claims, 4 Drawing Sheets

HOPPER WITH CARTRIDGE OPENER

FIELD OF THE INVENTION

This invention relates to component feeders of component placement machines. In particular, this invention relates to, but is not necessarily limited to, component feeders, such as hoppers, which are replenished with components from cartridges.

BACKGROUND OF THE INVENTION

Conventionally, printed circuit boards (PCBs) are placed with electrical components using placement machines. These components are provided to the placement machines from component feeders that include bulk feeders such as hoppers. Typically, hoppers in a manufacturing assembly line are grouped close to each other and to the placement machines for efficient delivery of components.

A hopper typically has a receiving portion for receiving components that are loaded in bulk. These components are directed from the receiving portion into a channel which feeds the components individually to a pick up location for a placement machine. Such a hopper needs to be replenished when depleted of components so that the placement machine can operate continuously without stopping for lack of components.

Typically, a hopper is replenished with components from a cartridge. A door of the cartridge is manually opened for the components to transfer into the receiving portion. Proper engagement of the cartridge to the receiving portion prevents spilling of components into adjacent hoppers. However, as hoppers are generally small and are grouped close together, it is difficult for an operator to manually open the door without spilling the components.

SUMMARY OF THE INVENTION

It is an object of this invention to overcome or at least alleviate at least one of the problems associated with component feeders, such as hoppers, which are replenished with components from cartridges.

According to one aspect of the invention, there is provided a hopper comprising:
  a receiving portion associated with said hopper for receiving components from a cartridge;
  door engagement means associated with said receiving portion for complementary engaging a hopper engagement means on a door of said cartridge,
    wherein said door engagement means is adapted to coact with said hopper engagement means when inserting said cartridge into said receiving portion to thereby at least partially open said door to allow transfer of at least some of said components into said hopper.

Preferably, said receiving portion can be an integral part of said hopper.

Alternatively, said receiving portion can be fixed or movably coupled to said hopper.

Preferably, said door engagement means can comprise at least one biased member.

Suitably, said hopper engagement means can comprise at least one catch having at least one abutment for abutting said biased member to open or close said door.

Alternatively, said hopper engagement means can comprise at least one biased member.

Preferably, said door engagement means can comprise at least one catch having at least one abutment for abutting said biased member to open or close said door.

Suitably, said door engagement means can coact with said hopper engagement means during relative movement when removing said cartridge from said hopper to thereby close said door and stop said transfer of said components.

Preferably, said door can be a sliding door.

BRIEF DESCRIPTION OF THE DRAWINGS

In order to describe the invention and to put it into practical effect, reference will now be made to a preferred embodiment as illustrated with reference to the accompanying drawings in which.

DETAILED DESCRIPTION OF THE INVENTION

Figure 1:
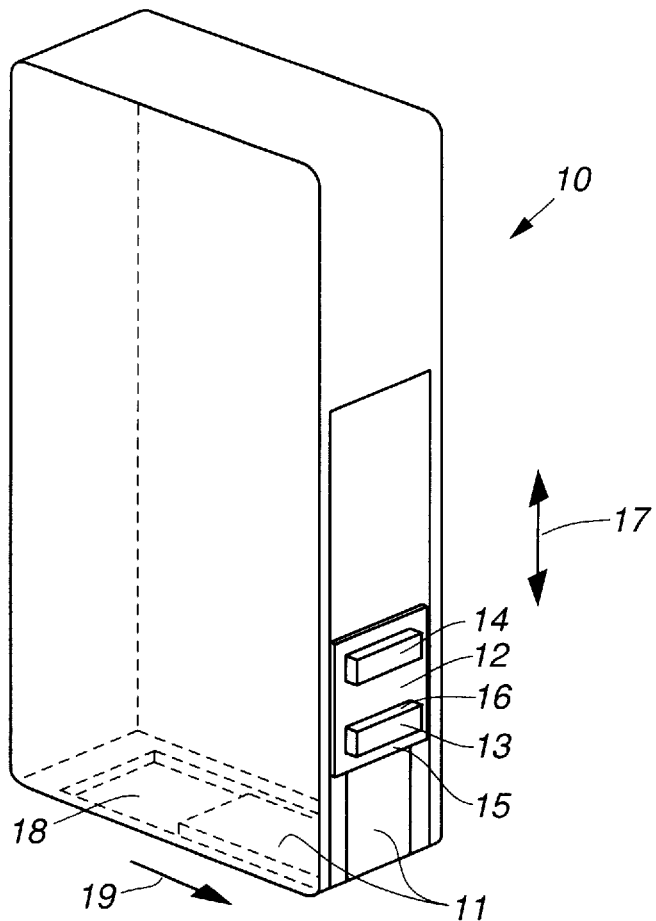
FIG. 1 shows a perspective of a cartridge with a front wall removed.

FIG. 1 shows a perspective of a cartridge 10 with a front wall removed. Cartridge 10 has a sliding door 11. Hopper engagement means on sliding door 11 comprises a catch 12. Catch 12 has two abutments 13,14. Abutment 13 has a bottom surface 15 and a top surface 16. Movement of catch 12 in a vertical direction indicated by arrow 17 opens and closes sliding door 11. An outlet 18 for components to transfer out of cartridge 10 is created when sliding door 11 is opened. Arrow 19 shows the direction of movement of sliding door 11 on the bottom of cartridge 10 to create outlet 18.

Figure 2:
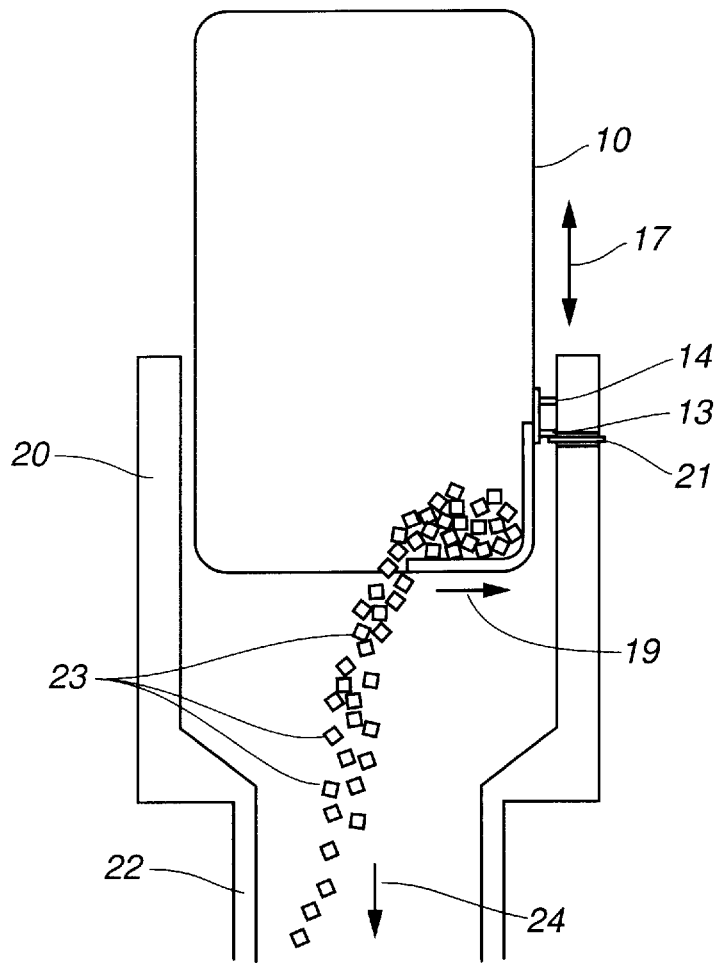
FIG. 2 shows the cartridge of FIG. 1 being inserted into a hopper in accordance with a preferred embodiment of the invention.

FIG. 2 shows cartridge 10 being inserted into a hopper 20 in accordance with a preferred embodiment of the invention. Hopper 20 has door engagement means comprising a biased member 21 and a receiving portion 22 for receiving components 23. Receiving portion 22 is an integral part of hopper 20 and has an opening at the top for a downward insertion of cartridge 10. Biased member 21 is adapted to coact with catch 12 when inserting cartridge 10 into receiving portion 20. Specifically, bottom surface 15 of abutment 13 abuts biased member 21 and forces sliding door 11 upwards. Sliding door 11 is thereby at least partially open to allow transfer of at least some of components 23 into hopper 20 through an outlet on a bottom surface of cartridge 10.

Advantageously, the invention enables proper engagement of cartridge 10 to hopper 20 when transferring components into receiving portion 22. Thus, this invention effectively prevents undesirable spilling of components into adjacent hoppers.

Figure 3:
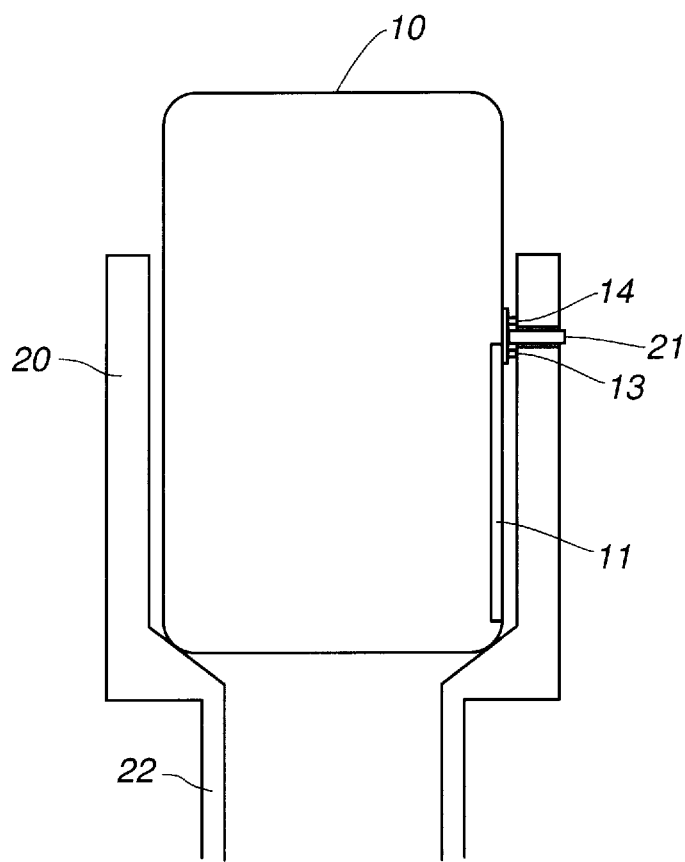
FIG. 3 shows the cartridge of FIG. 1 fully inserted into the hopper.

When cartridge 10 is fully inserted into hopper 20 as shown in FIG. 3, biased member 21 locks into catch 12 between abutments 13,14 as shown in FIG. 3. When thus locked, outlet 18 is at a maximum. At this maximum, cartridge 10 is prevented from going any further into hopper 20 because of a narrowing of hopper 20 at its lower half. As can be seen in FIG. 3, cartridge 10 is restrained by the narrowing. Consequently, biased member 21 cannot passed over abutment 14 and is thereby locked between abutments 13, 14. Transfer of components 23 from cartridge 10 into receiving portion 22 can be stopped at anytime by removing cartridge 10 from hopper 20. In removing cartridge 10 from hopper 20, biased member 21 coacts with catch 12 during relative movement when removing cartridge 10 from hopper 20 to thereby close sliding door 11 and stop the transfer of components 23. Specifically, top surface 16 of abutment 13 abuts biased member 21 to force sliding door 11 downwards.

Biased member 21 can be applied with a ball plunger that is resiliently biased to act laterally against catch 12. The ball plunger abuts with either bottom surface 15 or top surface 16 of abutment 13 depending on whether cartridge 10 is being inserted or removed.

Figure 4:
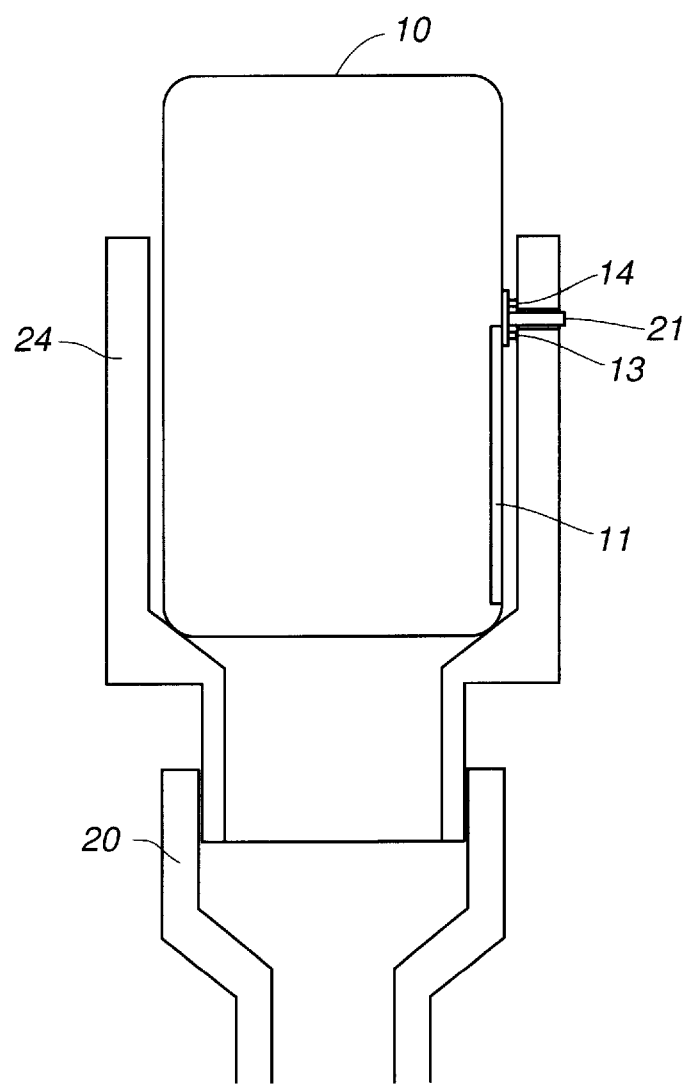
FIG. 4 shows a receiving portion for coupling to the cartridge of FIG. 1 in accordance with an alternate embodiment of the invention.

FIG. 4 shows a receiving portion 24 for coupling to cartridge 10 in accordance with an alternate embodiment of the invention. In this alternate embodiment, receiving portion 24 is fixed or movably coupled to hopper 20. Hence, receiving portion 24 enables cartridge 10 to be adapted to conventional hoppers as such hoppers may not have biased member 21 to coact with catch 12.

In both the preferred and alternate embodiments, the invention advantageously allow cartridge 10 to load components 23 into hopper 20 without an operator manually opening sliding door 11. Sliding door 11 can therefore be opened or close easily without the difficulty encountered with conventional hoppers being grouped close together. Hence, unlike the conventional hoppers, hopper 20 does not restrict an operator from loading components even when grouped together with other similar hoppers 20.

Although the invention has been described with reference to a preferred embodiment, it is to be understood that the invention is not restricted to the preferred embodiments described herein.

We claim:

1. A hopper comprising:

a receiving portion associated with said hopper for receiving components from a cartridge, said receiving portion having an opening at the top for a linear downward insertion of said cartridge;

door engagement means disposed on a side wall of said receiving portion and associated with said receiving portion for complementary engaging a hopper engagement means on a sliding door of said cartridge, wherein said door engagement means is adapted to coact laterally with said hopper engagement means during said linear downward insertion to thereby at least partially open said sliding door to allow transfer of at least some of said components into said hopper through an outlet on a bottom surface of said cartridge.

2. The hopper as claimed in claim 1 wherein said receiving portion is an integral part of said hopper.

3. The hopper as claimed in claim 1 wherein said receiving portion is fixed or movably coupled to said hopper.

4. The hopper as claimed in claim 1 wherein said door engagement means comprises at least one biased member.

5. The hopper as claimed in claim 4 wherein said hopper engagement means comprises at least one catch having at least one abutment for abutting said biased member to open or close said sliding door.

6. The hopper as claimed in claim 1 wherein said hopper engagement means comprises at least one biased member.

7. The hopper as claimed in claim 6 wherein said door engagement means comprises at least one catch having at least one abutment for abutting said biased member to open said sliding door.

8. The hopper as claimed in claim 1 wherein said door engagement means coacts with said hopper engagement means during relative movement when removing said cartridge from said hopper to thereby close said sliding door and stop said transfer of said components.

* * * * *

UNITED STATES PATENT AND TRADEMARK OFFICE
CERTIFICATE OF CORRECTION

PATENT NO. : 5,881,782
DATED : March 16, 1999
INVENTOR(S) : Foo, et. al.

It is certified that error appears in the above-identified patent and that said Letters Patent is hereby corrected as shown below:

Title page, item [75], delete "Morocco" as the country of residence listed for both inventors and insert --Malaysia--.

Signed and Sealed this

Twenty-fourth Day of August, 1999

Attest:

Q. TODD DICKINSON

*Attesting Officer*   *Acting Commissioner of Patents and Trademarks*